M. GOEHLER.
PORTABLE POWER OPERATED SAW.
APPLICATION FILED AUG. 17, 1911.
1,041,777.
Patented Oct. 22, 1912.
2 SHEETS—SHEET 1.
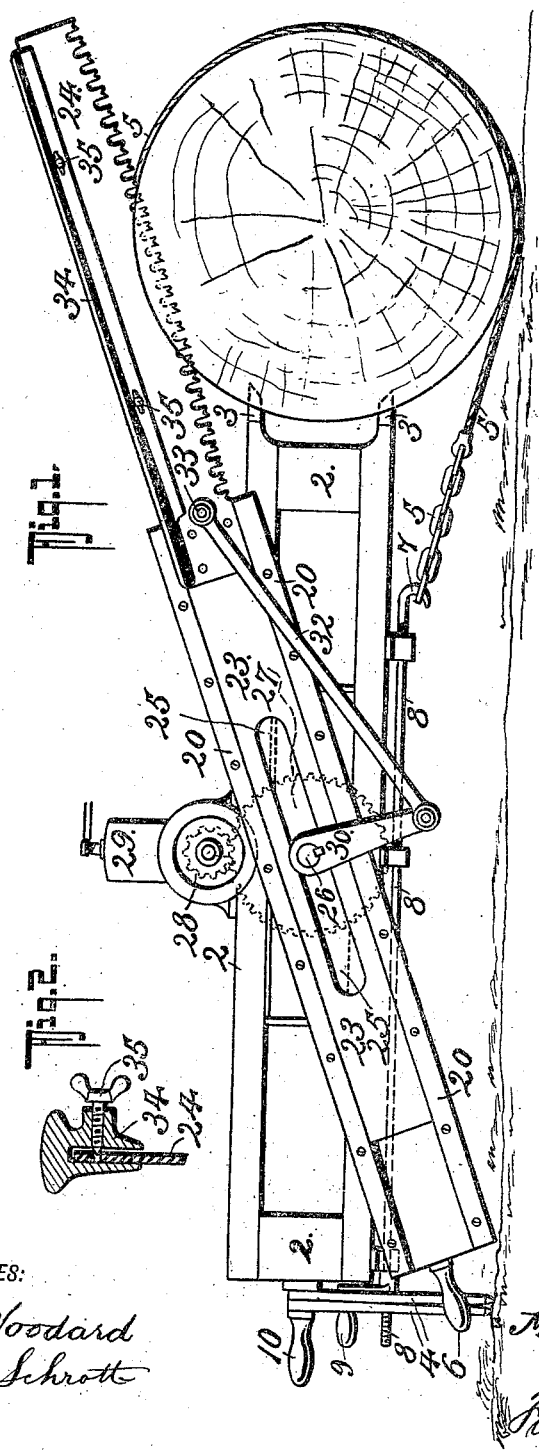

M. GOEHLER.
PORTABLE POWER OPERATED SAW.
APPLICATION FILED AUG. 17, 1911.
1,041,777.
Patented Oct. 22, 1912.
2 SHEETS—SHEET 2.
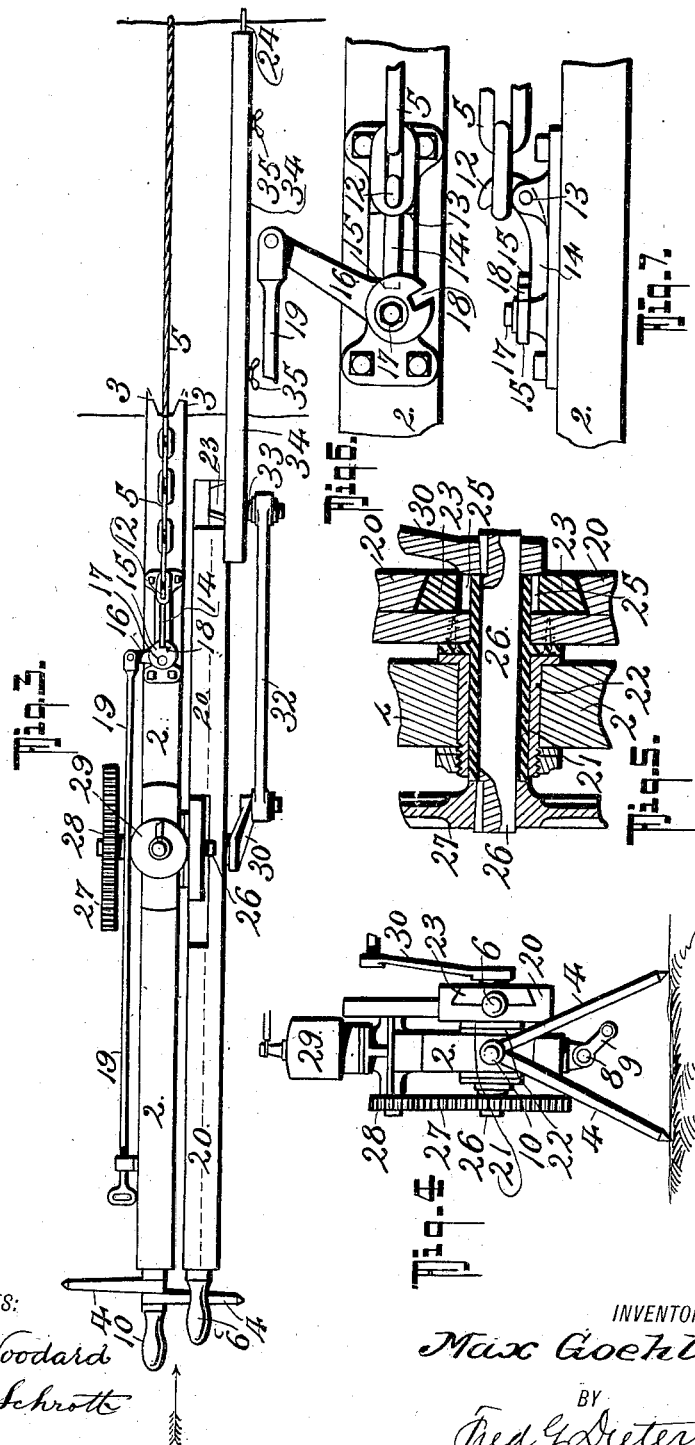
WITNESSES:
Hayward Woodard
John S. Schrott
INVENTOR
Max Goehler
BY
Fred G. Dieterich & Co.
ATTORNEYS

UNITED STATES PATENT OFFICE.

MAX GOEHLER, OF VANCOUVER, BRITISH COLUMBIA, CANADA.

PORTABLE POWER-OPERATED SAW.

1,041,777. Specification of Letters Patent. Patented Oct. 22, 1912.

Application filed August 17, 1911. Serial No. 644,488.

*To all whom it may concern:*

Be it known that I, MAX GOEHLER, a citizen of the Republic of Switzerland, residing at Vancouver, in the Province of British Columbia, Canada, have invented a new and useful Portable Power-Operated Saw, of which the following is a specification.

This invention relates to a portable power operated cross cut saw designed for use in the woods, for either felling trees or for cutting them up when fallen, into logs of suitable length for transportation.

The invention comprises the manner of supporting and of securing the carrying frame of the saw to the tree or log to be cut, and for effecting its rapid release from such attachment that it may be withdrawn when the tree is about to fall, also in the means for driving the slide which carries the cross cut saw through the same axis on which the saw carrying frame is pivotally mounted. These and other incidental features in the mechanism of the saw are fully described in the following specification, reference being made to the drawings by which it is accompanied, in which:

Figure 1 is a side elevation of the saw as applied to a fallen tree. Fig. 2 is an enlarged cross section of the reinforcing back with which the saw is furnished to support it while entering on its cut. Fig. 3 is a plan of the machine as shown in Fig. 1. Fig. 4 is an end view looking in the direction of the arrow in Fig. 3. Fig. 5, a cross section through the pivotal mounting of the support and saw slide frame with the shaft through which the saw is driven, and Figs. 6 and 7 show in plan and elevation the quick releasing hook by which the saw carrying frame is secured to the log on which it is to operate.

In these drawings 2 represents a light frame of wood provided at the end which is secured to the log with spikes 3, and at the other end with two pivotally mounted struts 4 to support the weight from the ground. It must be noted that these struts are so mounted that they may be used when the saw is applied vertically or horizontally. This frame 2 is tightly secured to a tree or log by a length of wire rope 5 which is connected to a hook 12 adjacent to the end having the spikes 3 and passing around the tree or log is connected at the other end to a hook 7 at the end of a rod 8, which is endwise movable in bearings secured to the frame 2 by a nut in the hub of a handle 9, which nut is threaded onto the screwed end of the rod 8. The wire rope 5 being passed around the log and its ends connected to the hooks 12 and 7 it is tightened on and its spikes 3 forced into the log by turning the handle 10, and when the struts 4 are adjusted to support the other end of the frame 2 that frame is steadily supported and secured to the log.

To enable the securing band 5 to be quickly released from the hook 12 when required, as when felling a tree and it is about to fall, that hook is mounted adjacent to the bend on a pin 13, see Figs. 6 and 7, and the shank 14 is, when the hook is in use, retained by a lock plate 15 forming the hub of a lever 16 pivotally mounted at 17 and having a release notch 18 through which the end of the shank 14 may pass when the notch is moved into the release position over it. The lever 16 is operated to effect the release by a rod 19 connected to it and provided with a loop handle adjacent to the outer end of the frame 2.

The frame 20 in which the saw carrying head 23 is slidable is pivotally mounted on the carrying frame 2 by means of a hollow bearing 21 secured to the frame 20 and fitting in a bushing 22 secured to the frame 2. This slidable member 23 is reciprocated in the frame 20 by a crank 30 secured on a shaft 26 passing through the hollow bearing 21 and rotated therein by a wheel 27 from a pinion 28 of a small high speed motor 29, preferably an internal combustion engine. The crank 30 is connected to a stud 33 projecting from the slidable member 23 by a rod 32 and 23 is provided with an elongated aperture 25 to clear the hollow bearing 21 through which the driving shaft of the crank passes.

The saw 24 may be secured to its driving head 23 in any approved manner and to support and afford sufficient rigidity to the saw blade while it is entering on its cut the back edge of it is provided with a removable strengthening bar 34, see Figs. 1 and 2. This bar is secured to the blade by small screws 35 the ends of which are pointed or reduced to enter apertures drilled in the saw blade. The reinforcing back 34 may or may not be connected to the saw carrying head 23 but such connection, if used, should be made in a manner that the blade will readily free itself when the saw has entered into its cut a sufficient distance for it to be connected thereby. When this is the case the screws 35 are withdrawn and the back bar 34 removed or, as the saw enters the cut, it will be displaced thereby and will fall away.

As the supporting frame 2 is strongly and rigidly secured to the tree or log to be cut and as the saw carrying frame 20 is pivotally mounted to it and the driving shaft passes through the same axis the saw may be fed to its work by a manual effort exerted on a handle 6 projecting from the end of the saw carrying frame 20. A handle 10 projects in a similar manner from the end of the rigidly supported frame 2.

A portable saw is thus provided the frame of which is dependent chiefly for the rigidity of its support on the manner of its attachment to the tree or log to be cut, and which may be quickly released from such support. By the use of a high speed motor mounted on the supporting frame and applied in the convenient manner described to the saw frame a considerable reduction of weight is effected over the usual direct acting cylinder, and from the manner of mounting the saw carrying slide on the same axis through which the saw is driven a satisfactory manner of manually feeding the saw to its work is applied.

Having now particularly described my invention I hereby declare that what I claim as new and desire to be protected in by Letters Patent, is:

1. In a power operated saw, a main supporting frame, a bushing mounted in said frame, a hollow bearing mounted in said bushing, a slideway frame member securely mounted on said hollow bearing member, a slide mounted in said slideway frame and having a slot through which said hollow bearing member projects, a crank shaft mounted in said hollow bearing, means for applying power to said crank shaft, a saw carried by said slide, and means for transmitting the movement of said crank shaft to said saw.

2. In a portable saw, a main supporting frame including means for securing it to a log, a sleeve mounted in said frame, a hollow bearing pivotally mounted in said sleeve and having a flange intermediate its ends, a slideway frame member mounted on said bearing and secured to said flange, a slotted slide mounted in said slideway through the slot of which slide said hollow bearing projects, a saw carried by said slide, a crank shaft mounted in said hollow bearing and coöperatively connected with said saw, an engine mounted on said main frame, and power transmitting connections between said engine and said crank shaft, substantially as shown and described.

In testimony whereof I have signed my name to this specification in the presence of two undersigned witnesses.

MAX GOEHLER.

Witnesses:
ROWLAND BRITTAIN,
MAY WHYTE.